US012450949B2

(12) United States Patent
Sarathy et al.

(10) Patent No.: US 12,450,949 B2
(45) Date of Patent: Oct. 21, 2025

(54) POSTURE AND MOTION MONITORING USING MOBILE DEVICES

(71) Applicant: Apple Inc., Cupertino, CA (US)

(72) Inventors: Aditya Sarathy, Santa Clara, CA (US); Rene F. Aguirre Ramos, Poway, CA (US); Umamahesh Srinivas, Milpitas, CA (US); Yongyang Nie, New York, NY (US)

(73) Assignee: Apple Inc., Cupertino, CA (US)

( * ) Notice: Subject to any disclaimer, the term of this patent is extended or adjusted under 35 U.S.C. 154(b) by 368 days.

(21) Appl. No.: 17/950,664

(22) Filed: Sep. 22, 2022

(65) Prior Publication Data

US 2023/0096949 A1 Mar. 30, 2023

Related U.S. Application Data

(60) Provisional application No. 63/248,357, filed on Sep. 24, 2021.

(51) Int. Cl.
| | |
|---|---|
| *G06V 10/00* | (2022.01) |
| *G06T 7/30* | (2017.01) |
| *G06T 7/50* | (2017.01) |
| *G06T 7/73* | (2017.01) |
| *G06V 40/20* | (2022.01) |

(52) U.S. Cl.
CPC ............... *G06V 40/23* (2022.01); *G06T 7/30* (2017.01); *G06T 7/50* (2017.01); *G06T 7/75* (2017.01)

(58) Field of Classification Search
None
See application file for complete search history.

(56) References Cited

U.S. PATENT DOCUMENTS

| | | | |
|---|---|---|---|
| 12,154,367 B2 * | 11/2024 | Powell | G06T 13/40 |
| 2020/0401224 A1 * | 12/2020 | Cotton | A61B 5/742 |
| 2022/0207903 A1 * | 6/2022 | Matsumoto | G06V 20/64 |

(Continued)

OTHER PUBLICATIONS

T. von Marcard, R. Henschel, M. J. Black, B. Rosenhahn, and G. Pons-Moll, "Recovering accurate 3D human pose in the wild using Imus and a moving camera," Lecture Notes in Computer Science, pp. 614-631, 2018. doi:10. 1007/978-3-030-01249-6_37 (Year: 2018).*

(Continued)

*Primary Examiner* — Amir Alavi
(74) *Attorney, Agent, or Firm* — Fish & Richardson P.C.

(57) ABSTRACT

Embodiments are disclosed for posture and motion monitoring using mobile devices. In an embodiment, a method comprises: obtaining motion data obtained from at least one motion sensor worn by a user; obtaining at least one frame of skeletal data of the user based on at least one of camera data or depth data; calibrating, with the at least one processor, the motion data and skeletal data to determine a calibration offset; synchronizing the motion data and skeletal data; generating, with the at least one processor, a body pose of the user by: aligning reference frames of the synchronized motion data and the synchronized skeletal data using the calibration offset; estimating the body pose of the user based on the aligned motion data and skeletal data; and classifying, using a machine learning model, the estimated body pose of the user.

16 Claims, 8 Drawing Sheets

(56) References Cited

U.S. PATENT DOCUMENTS

2023/0025516 A1* 1/2023 Wang ..................... G10L 15/22

OTHER PUBLICATIONS

G. Glonek and A. Wojciechowski, "Hybrid orientation based human limbs motion tracking method," Sensors, vol. 17, No. 12, p. 2857, Dec. 2017. doi:10.3390/s17122857 (Year: 2017).*

F. Destelle et al., "Low-cost accurate skeleton tracking based on fusion of kinect and wearable inertial sensors," 2014 22nd European Signal Processing Conference (EUSIPCO), Lisbon, Portugal, 2014, pp. 371-375 (Year: 2014).*

Fuad, Z., Unel, M. (2018). Human Action Recognition Using Fusion of Depth and Inertial Sensors. In: Campilho, A., Karray, F., ter Haar Romeny, B. (eds) Image Analysis and Recognition. ICIAR 2018. Lecture Notes in Computer Science( ), vol. 10882. Springer, Cham. doi:10.1007/978-3-319-93000-8_42 (Year: 2018).*

S. Hwang, K. Ko, and S. B. Pan, "Motion Data Acquisition Method for motion analysis in golf," Concurrency and Computation: Practice and Experience, vol. 33, No. 2, Apr. 2019. doi:10.1002/cpe.5215 (Year: 2019).*

C. Kalkbrenner, et al., "Motion capturing with inertial measurement units and Kinect—tracking of limb movement using optical and orientation information," Proc. of the Int. Conf. on Biomedical Electronics and Devices, pp. 120-126, 2014. doi:10.5220/0004787601200126 (Year: 2014).*

* cited by examiner

POSTURE AND MOTION MONITORING USING MOBILE DEVICES

CROSS-REFERENCE TO RELATED APPLICATION

This application claims priority to U.S. Provisional Patent Application No. 63/248,357, filed Sep. 24, 2021, the entire contents of which are incorporated herein by reference.

TECHNICAL FIELD

This disclosure relates generally to monitoring the posture and motion of a user while the user is engaged in a physical activity, such as exercise or a sport.

BACKGROUND

Existing wireless mobile devices (e.g., smartphone, smartwatch, earbuds) include motion sensors that provide motion data, such as acceleration and rotation rate. For example, a gyroscope in a smartwatch can detect arm rotation rate and motion sensors in earbuds can detect acceleration and head rotation rate. The acceleration and rotation rate measured by the motion sensors embedded in the smartwatch can be used for a variety of applications, such classifying physical activities that the user may be engaged in and then computing various fitness metrics for that activity, such as calories burned by the user. The acceleration and rotation rate measured by the motion sensors embedded in the ear buds can be used to control audio playback (e.g., pause when left or right ear piece is removed), microphone beamforming to reduce background noise and to anchor a surround sound field played through the earbuds in immersive audio applications.

Most smartphones include motion sensors and at least one video camera. Some smartphones also include at least one depth sensor, such as a time-of-flight (TOF) sensor. All three mobile devices just described typically include a wireless transceiver that allows the devices to communicate with each other over short-range communication channels (e.g., Bluetooth™ channels) and share data for use in a variety of applications related to fitness monitoring, health monitoring and immersive audio, for example.

SUMMARY

Embodiments are disclosed for user posture and motion monitoring using mobile devices.

In an embodiment, a method comprises: obtaining, with at least one processor, motion data obtained from at least one motion sensor worn by a user; obtaining, with the at least one processor, at least one frame of skeletal data of the user based on at least one of camera data or depth data; calibrating, with the at least one processor, the motion data and skeletal data to determine a calibration offset; synchronizing, with the at least one processor, the motion data and skeletal data; generating, with the at least one processor, a body pose of the user by: aligning reference frames of the synchronized motion data and the synchronized skeletal data using the calibration offset; estimating the body pose of the user based on the aligned motion data and skeletal data; and classifying, with the at least one processor and using a machine learning model, the estimated body pose of the user.

In an embodiment, the at least one motion sensor is worn on limb of the user.

In an embodiment, the at least one motion sensor is worn on or in at least one ear of the user.

In an embodiment, the skeletal data includes at least one joint position.

In an embodiment, the motion data is acceleration data and predicting the body pose of the user, further comprises: estimating, based on a change in the acceleration data, a change in velocity of the at least one joint position; and estimating, based on the change in velocity, a change in the at least one joint position.

In an embodiment, the estimating is provided by a Kalman filter where the acceleration data and 3D joint position are observations used by the Kalman filter to estimate the change in the position and velocity of the at least one joint position.

In an embodiment, the at least one joint position is interpolated from a plurality of joint positions.

In an embodiment, the at least one joint position is interpolated using polynomial interpolation.

In an embodiment, the skeletal data is three-dimensional (3D) skeletal data.

In an embodiment, the method further comprises: determining, with the at least one processor, a calibration error based on difference between the predicted body pose of the user and a previously predicted body pose of the user; and updating, with the at least one processor, the calibration offset based on the calibration error.

Other embodiments can include an apparatus, computing device and non-transitory, computer-readable storage medium.

Particular embodiments disclosed herein provide one or more of the following advantages. A skeletal model and motion data are fused together to monitor the pose of the user and the rate and range of motion of the user, which can provide real-time feedback to the user through visual, audio or haptic feedback. In fitness training applications, this feedback enables communication between the user and his/her coach/fitness trainer located remotely by transmitting to the coach/fitness trainer relevant data about the real-time pose and motion of the user while engaged in exercise or a sport (e.g., monitoring golf swing, monitoring yoga poses, remote sports coaching). Another advantage is to enable accurate tracking of body pose under low-power applications. Video capture and generation of skeletal data consumes a lot of power. The filter-based interpolation scheme disclosed herein facilitates low-power tracking by filling in gaps in video frames with the cheaper (battery-wise) motion data sampled at a much higher rate than the video data.

The details of one or more implementations of the subject matter are set forth in the accompanying drawings and the description below. Other features, aspects and advantages of the subject matter will become apparent from the description, the drawings and the claims.

DETAILED DESCRIPTION

Overview

Many consumers own a smartphone, a smartwatch and a headset (e.g., ear buds). These devices all include motion sensors, such as accelerometers, gyroscopes and altimeters. These devices typically include one or more video cameras. Some of the more advanced devices also include depth sensors, such as a TOF sensor. The camera data and/or depth data can be used to generate a skeletal model of human body. Techniques for generating two-dimensional (2D) skeletal models from camera data are well-known. Techniques for lifting the 2D skeletal models to three-dimensional (3D) skeletal models are also well-known. A 3D skeletal model provides an excellent resource for determining the full body posture of a user. The skeletal model typically includes joint positions for all of the joints of the human body, such as ankles, knees, hips, waist, shoulders, elbows, wrists and neck. In some embodiment, the skeletal model can be used to generate a skeletal mesh. The positions are typical in a camera and/or depth sensor reference frame, which is often different than the reference frames of inertial sensors. Additionally, the data rates for motion data and skeletal data may be different depending on the device and/or application.

It is desirable to use motion data and skeletal data together to estimate a user's body pose. This information can be used in a variety of applications, such as monitoring golf swings, monitoring Yoga poses, gaming applications (e.g., TV camera+on-body motion sensors), people disambiguation in a multi-person scene based on the uniqueness of per-user behavior captured by the respective motion sensors and remote monitoring by fitness trainers or coaches. FIGS. 1A-1D illustrate an application of posture and motion monitoring for monitoring a user's golf swing, according to an embodiment.

Figure 1A:
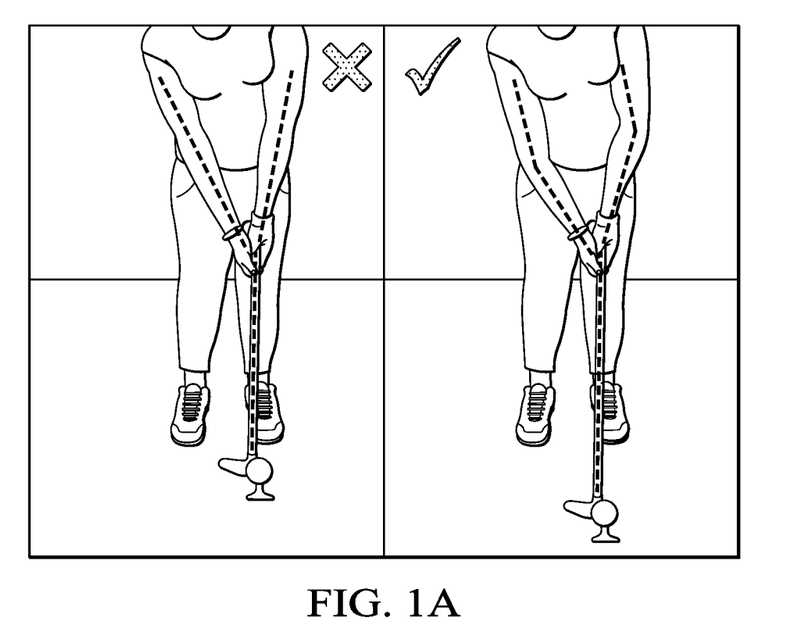
FIGS. 1A-1D illustrate an application of posture and motion monitoring for monitoring a user's golf swing, according to an embodiment.
Figure 1B:
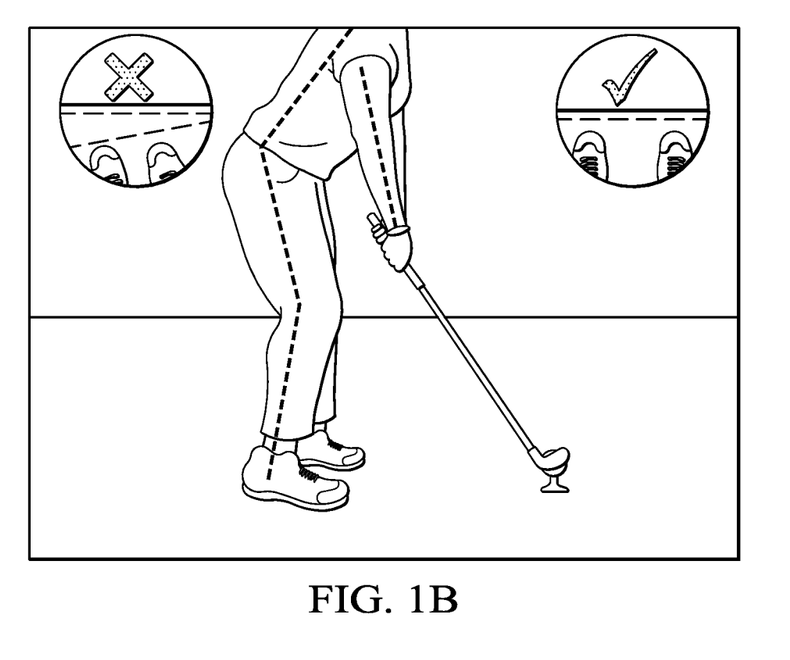

Referring to FIGS. 1A and 1B, the estimated body pose can be used to determine if the user's golf form or stance is correct. This can be done by kinematic modeling of a position and orientation of a smartwatch worn on the wrist of the user. For example, the motion data provided by the smartwatch can be used to measure the physical forces at impact during the swing. Additionally, the skeletal data can be used to detect the user's form and stance by monitoring the position of the elbow and shoulder joints of the user, for example.

Figure 1C:
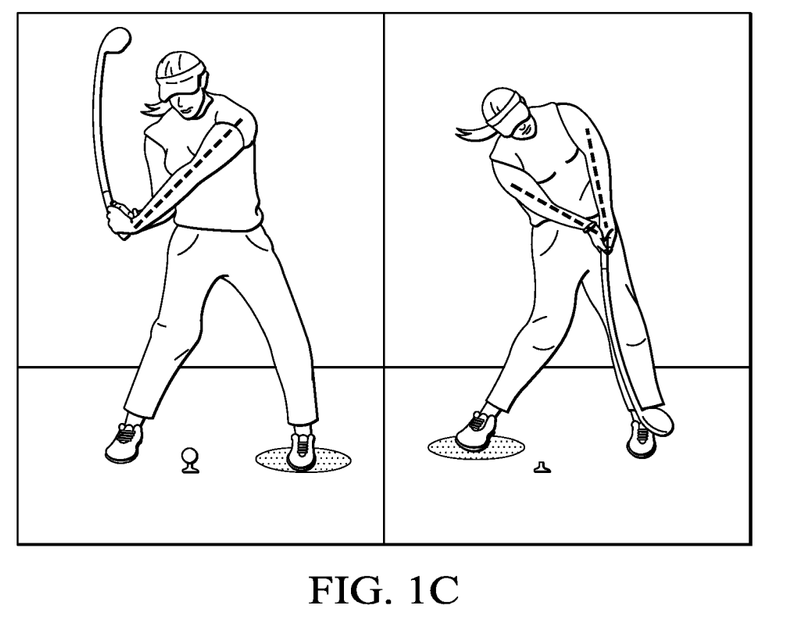
Figure 1D:
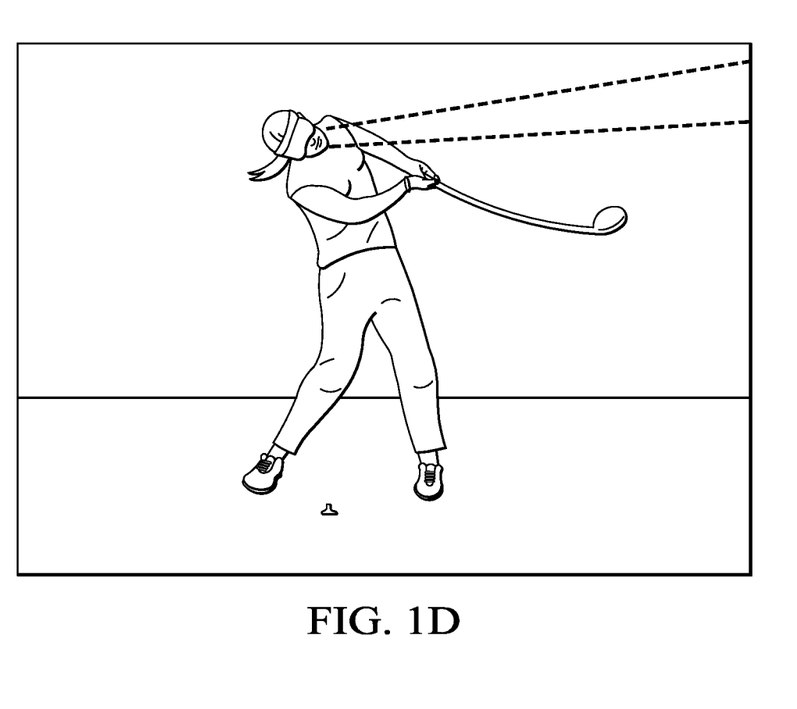

Referring to FIGS. 1C and 1D, the estimated body pose can also be used to monitor the user's swing and follow-through body posture. If the user is wearing a headset with motion sensors, then motion data from the headset can also be used estimate body pose to monitor the user's head movement during the swing. If the user has a smartphone in their pocket, the motion data from the smartphone can also be used to estimate body pose to monitor the user's hip rotation during the swing. Motion sensors in the smartwatch can be used to estimate body pose to monitor the user's follow through.

In sum, FIGS. 1A-1D illustrate one example application that can use the estimated body pose generated from motion data provided by different mobile devices located on different parts of the user's body in combination with 2D or 3D skeletal data and/or a skeletal mesh. The fusion of motion data and skeletal data will now be described in reference to FIG. 2.

Figure 2:
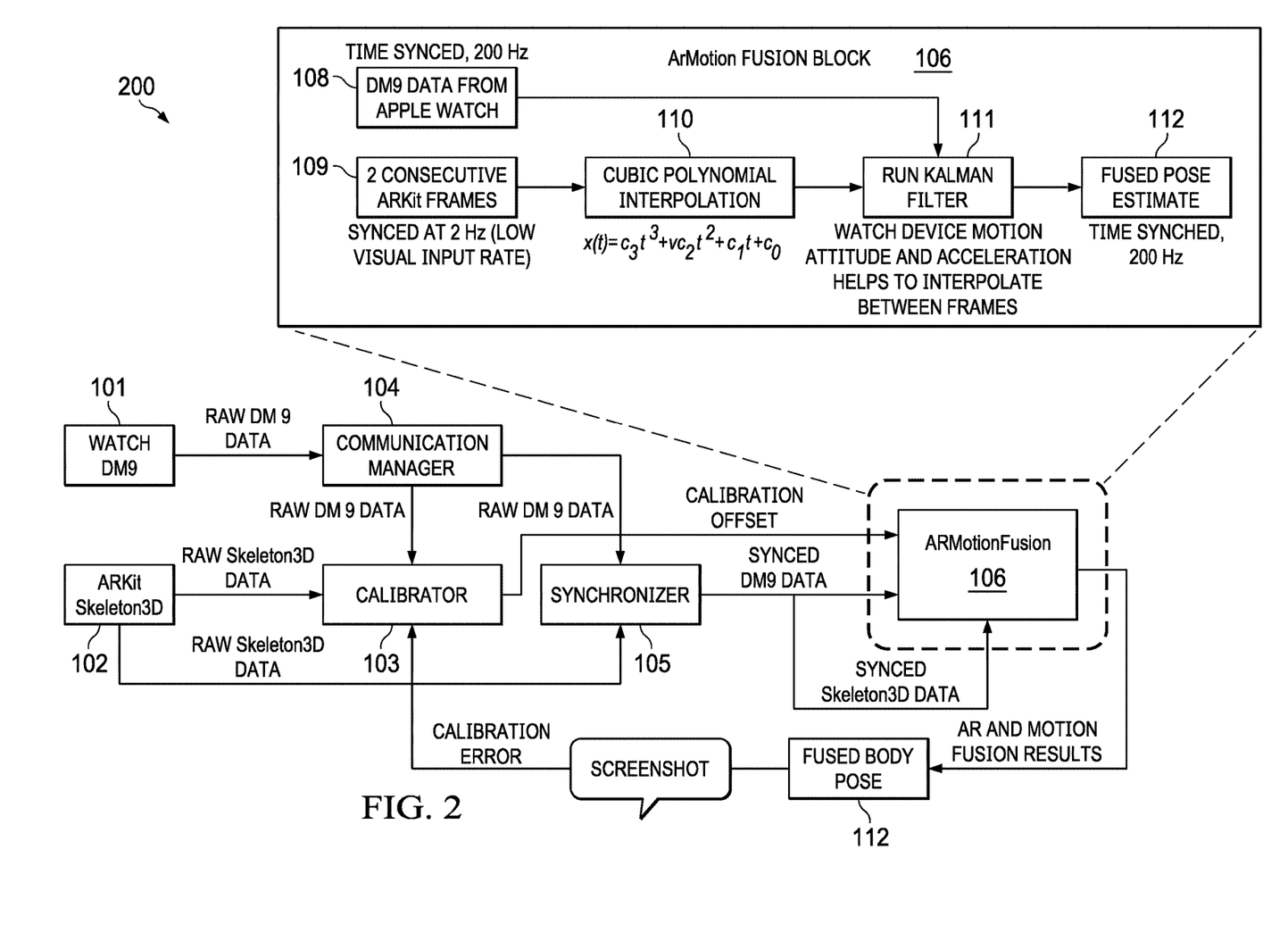
FIG. 2 is a block diagram of a system for monitoring posture and motion with mobile devices, according to an embodiment.

FIG. 2 is a block diagram of system 200 for monitoring posture and motion with mobile devices, according to an embodiment. System 200 includes smartwatch 201, skeletal data generator 202, calibrator 203, communication manager 204, synchronizer 205 and body pose estimator 206. Body pose estimator 206 further comprises interpolator 210 and estimation filter 211 (e.g., a Kalman filter). In an embodiment, system 200 can be implemented on a smartphone, tablet computer, network computer or any other device, hereinafter referred to as a "central computing device."

In operation, raw motion data (e.g., acceleration, rotation rate) from inertial sensors in smartwatch 201 provide motion data to communication manager 204. Communication manager 204 can be software process (e.g., a daemon) that runs on, for example, a processor of the central computing device, as described in reference to FIG. 6. The raw motion data is transmitted at a first data rate by a wireless transmitter smartwatch 201 over a wireless short range communication channel (e.g., a Bluetooth™ channel) to a wireless receiver in the central computing device. The raw motion data is stored in an incoming buffer in the central computing device and retrieved by communication manager 204 and distributed to calibrator 203 and synchronizer 205 using an internal bus system. The raw motion data is represented in, for example, a body reference frame fixed to the body of smartwatch 201.

Skeletal data generator 202 can also be implemented on the central computing device and retrieves 2D camera images and/or 3D depth data at a second data rate from camera(s) and depth sensor(s), respectively, embedded in or coupled to the central computing device over an internal bus system and processes the camera/depth data using known 2D and/or 3D skeletal modeling processes. In the example shown, skeletal data generator 202 generates 3D skeletal data comprising joint positions in a 3D reference frame. The second data rate can be higher or lower than the first data rate for the motion data. The raw skeletal data is stored in a buffer in the central computing device and retrieved by synchronizer 205.

Synchronizer 205 provides multi-sensor data synchronization techniques to synchronize the motion data and skeletal data and outputs synced motion data and synced skeletal data to data fuser 106. Any suitable data synchronization process can be used. In an embodiment, the motion data and skeletal data are each time stamped using their source time base. The data is feed into an interpolation resampling block that outputs the motion data and skeletal data with updated timestamps using a common shared time base. Depending on the motion or skeletal data input data sample rates, the interpolation resampling block might perform up conversion or down conversion sample rate adjustments.

Figure 3:
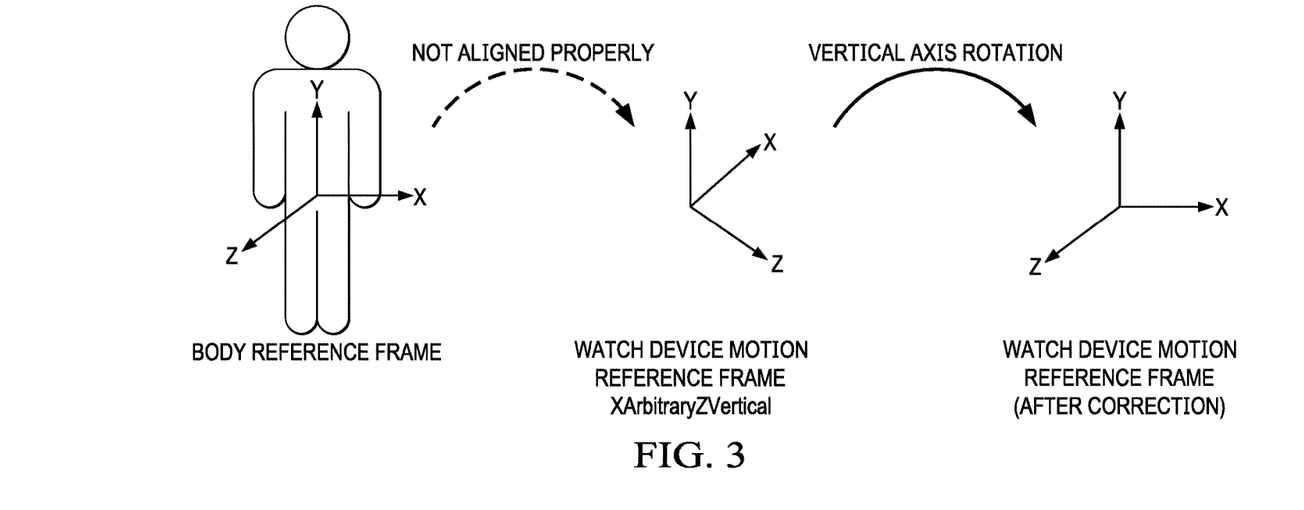
FIGS. 3 and 4 illustrate operation of the calibrator shown in FIG. 2, according to an embodiment.
Figure 4:
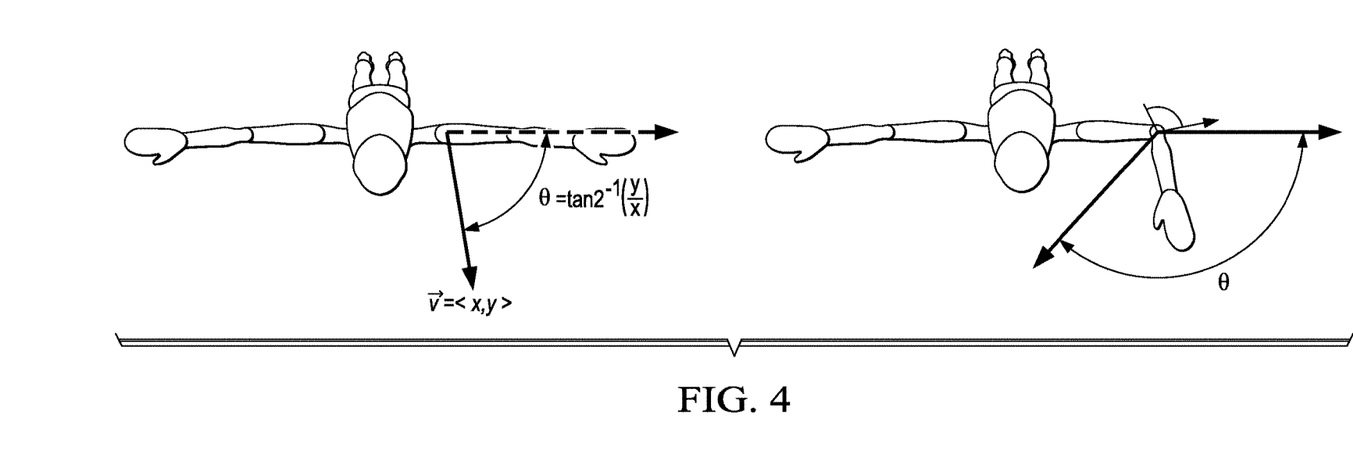

In an embodiment, a calibration error is computed based on difference between the estimated body pose of the user and a previously estimated body pose of the user. The calibration error (misalignment) can be used by calibrator 203 to generate the calibration offset (rotation(s) to remove the misalignment), as described further in reference to FIGS.

3 and 4. Note that the calibration described above need not be a one-time action during initialization; rather it can be performed multiple times opportunistically.

FIGS. 3 and 4 illustrate operation of the calibrator 203 shown in FIG. 2, according to an embodiment. Calibrator 203 is used to compute rotation(s) between the body frame of smartwatch 102 and the reference frame of the skeletal data. The resulting motion data is defined in the reference frame of the skeletal data. A direction cosine matrix or delta quaternion can be used to align the two frames. In the example shown in FIG. 3, the body frame is rotated around the Y axis by an angular displacement causing a misalignment with the X and Z axes of the skeletal data reference frame. Calibrator 203 rotates the body frame about the Y axis so that its X and Z axes are aligned with the X and Z axes of the skeletal data reference frame. FIG. 4 shows the calibrated motion about the Y axis. The calibrated motion and skeletal data is then input into body pose estimator 206. As previously stated, the amount of misalignment (calibration error) to be corrected can be provided by the body pose estimator 206.

Figure 5:
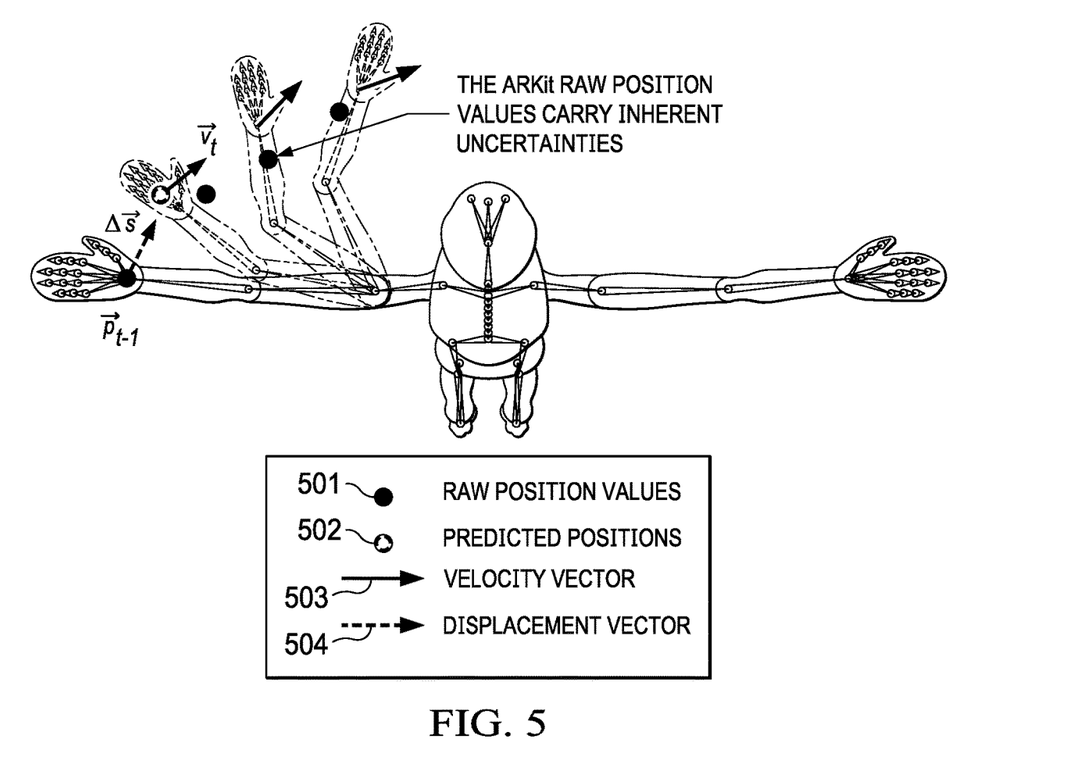
FIG. 5 illustrates predicting joint positions using motion data and skeletal data, according to an embodiment.

FIG. 5 illustrates estimating body pose 212 using motion data and skeletal data, according to an embodiment. Body pose estimator 206 receives the calibrated and synchronized motion and skeletal data and inputs the data into an estimation filter, which in this example is Kalman filter 211. If Kalman filter 211 is running at the same data rate as the motion data (e.g., 200 Hz), and the skeletal data is running at a slower data rate or vice-versa, interpolator 210 can be used to fill in the missing skeletal or motion data. In the embodiment shown, a polynomial interpolator (e.g., a cubic spline) is applied to the skeletal data.

Kalman filter 111 computes the estimated body pose 212 using the well-known Kalman filter formulation, where the joint position $\vec{P}_t$ and velocity $\vec{V}_t$ are the states in the state vector at the current measurement epoch at time t and the motion data and skeletal data are the observations that are used to correct the predicted joint position and velocity in the Kalman filter correction equation. In an embodiment, the predicted joint position state is given by Equations [1] and [2]:

$$\vec{P}_t = \vec{P}_{t-1} + \vec{V}_t \Delta t + \frac{1}{2} \vec{a}_t \Delta t^2, \quad [1]$$

where $\vec{P}_t$ is the current joint position vector for the current measurement epoch, $\vec{P}_{t-1}$ is the previous joint position vector computed during the previous measurement epoch, $\vec{a}_t$ is the current joint acceleration vector, $\Delta t$ is the time delta for the current measurement epoch (e.g., 0.005 seconds @ 200 Hz) and $\vec{V}_t$ is the predicted joint velocity vector shown in Equation [2]:

$$\vec{V}_t = \vec{V}_{t-1} + (1 - k_p)(\Delta \vec{a}_s \Delta t) + (1 - k_v)\left(\frac{\Delta s_{visual}}{\Delta t}\right), \quad [2]$$

where $k_p$ and $k_v$ are the Kalman gains for the position and velocity states, respectively, $\vec{a}_s$ is the calibrated/synchronized acceleration vector from the motion sensor and $\Delta s_{visual}$ is the displacement in the joint position in the skeletal data for the current and previous measurement epochs. The corrected predicted joint position is given by Equation [3] depending on whether skeletal (visual) data was available for the current measurement epoch:

$$\vec{P}_{next} = \begin{bmatrix} k_p * (\vec{P}_t) + k_v * (\vec{P}_{visual}) & \text{if visual input} \\ \vec{P}_t & \text{if no visual input} \end{bmatrix} \quad [3]$$

where $\vec{P}_{visual}$ is a joint position provided in the skeletal data. The measurement noise covariance and state noise covariance (both not shown) can be determined empirically and tuned using known techniques.

A crucial complementary aspect of using motion data with video data, as described above, is more accurate depth perception. Camera-only pose estimation faces challenges with motion that is mostly in a direction orthogonal to the plane of the camera, such as the direction of the arm swing in FIG. 1B (camera has a profile view of the user, not a frontal view). This information (e.g., distance of wrist from camera at various points throughout the swing, etc.) can be recovered from the motion data unambiguously.

Figure 6:
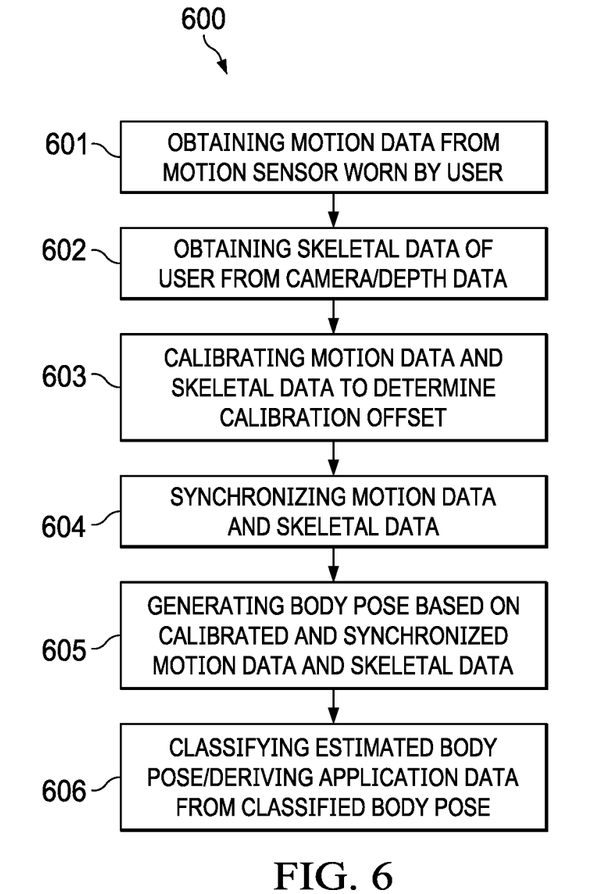
FIG. 6 is a flow diagram of a process of posture and motion monitoring using mobile devices, according to an embodiment.

FIG. 6 is a flow diagram of a process 600 of posture and motion monitoring using mobile devices, according to an embodiment. Process 600 can be implemented using the software/hardware architectures described in reference to FIGS. 7 and 8.

Process 600 includes the steps of obtaining motion data from at least one motion sensor worn by the user (601), obtaining skeletal data of the user from a camera and/or depth sensor (602), calibrating the motion data and the skeletal data to determine a calibration offset (603), synchronizing the motion data and skeletal data (604), generating a body pose of the user based on the calibrated and synchronized motion data and skeletal data (605) and classifying the estimated body pose (605). Application data can then be derived from the classified body pose.

As previously described, the motion data can be raw acceleration data and/or rotation data from a smartwatch, headset or any other wearable device worn by the user. The skeletal data can include 2D or 3D joint positions which are computed from camera images and/or depth data (aka "point cloud"). The calibration step is used to align the reference frames of the motion data and skeletal data so that the body pose prediction can be computed in a single reference frame. The synchronization step is performed when the motion data and skeletal data are not time synchronized which is a common scenario because of time and power needed to capture image data compared to inertial sensor measurements. The body pose estimate can be generated using, for example, a Kalman filter, an extended Kalman filter or any other estimator or observer formulation (e.g., a least squares formulation).

In an embodiment, the estimated body pose in the form of joint positions can be input into a motion classifier to classify the motion. An example motion classifier is such a deep learning neural network trained on different configurations of joint positions. Other supervised or unsupervised machine learning techniques can be used, such as clustering joint positions (e.g., k-means, DBSCAN). For example, the output of the classifier could be a label and a confidence score for the label. For example, for fitness applications the label could be a particular exercise, such as squats, pushups, etc. The classified motion can be used to derive other data, such as metrics or scores (e.g., fitness scores, calories burned, repetitions).

Example Software/Hardware Architectures

Figure 7:
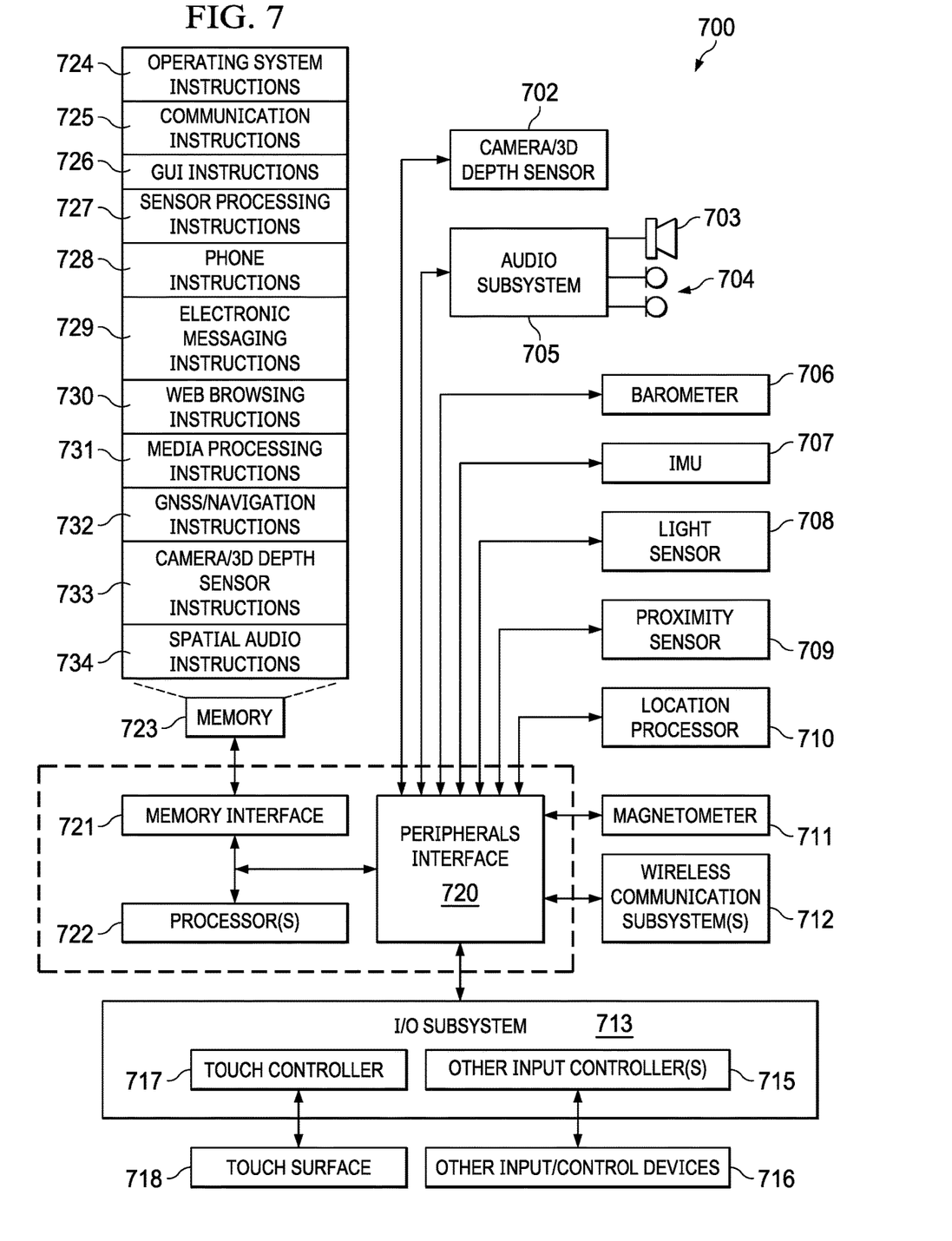
FIG. 7 is a conceptual block diagram of a source device software/hardware architecture implementing at least one of the features and operations described in reference to FIGS. 1-6.

FIG. 7 is a conceptual block diagram of source device software/hardware architecture 700 implementing the features and operations described in reference to FIGS. 1-6. Architecture 700 can include memory interface 721, one or more data processors, digital signal processors (DSPs), image processors and/or central processing units (CPUs) 704 and peripherals interface 720. Memory interface 721, one or more processors 722 and/or peripherals interface 720 can be separate components or can be integrated in one or more integrated circuits.

Sensors, devices and subsystems can be coupled to peripherals interface 720 to provide multiple functionalities. For example, one or more motion sensors 707, light sensor 708 and proximity sensor 709 can be coupled to peripherals interface 720 to facilitate motion sensing (e.g., acceleration, rotation rates), lighting and proximity functions of the wearable computer. Location processor 710 can be connected to peripherals interface 720 to provide geo-positioning. In some implementations, location processor 710 can be a GNSS receiver, such as the Global Positioning System (GPS) receiver. Electronic magnetometer 711 (e.g., an integrated circuit chip) can also be connected to peripherals interface 720 to provide data that can be used to determine the direction of magnetic North. Electronic magnetometer 711 can provide data to an electronic compass application. Motion sensor(s) 707 can be an IMU that includes one or more accelerometers and/or gyros (e.g., 3-axis MEMS accelerometer and 3-axis MEMS gyro) configured to determine change of speed and direction of movement of the source device. Barometer 706 can be configured to measure atmospheric pressure around the mobile device.

Camera/3D depth sensor 702 captures digital images and video and can include both forward-facing and rear-facing cameras. The 3D depth sensor can be any sensor capable of capturing 3D data or point clouds, such as a time of flight (TOF) sensor or LiDAR.

Communication functions can be facilitated through wireless communication subsystems 712, which can include radio frequency (RF) receivers and transmitters (or transceivers) and/or optical (e.g., infrared) receivers and transmitters. The specific design and implementation of the wireless communication subsystem 712 can depend on the communication network(s) over which a mobile device is intended to operate. For example, architecture 700 can include communication subsystems 724 designed to operate over a GSM network, a GPRS network, an EDGE network, a Wi-Fi™ network and a Bluetooth™ network. In particular, the wireless communication subsystems 712 can include hosting protocols, such that the mobile device can be configured as a base station for other wireless devices.

Audio subsystem 705 can be coupled to a speaker 703 and one or more microphones 704 to facilitate voice-enabled functions, such as voice recognition, voice replication, digital recording and telephony functions. Audio subsystem 705 can be configured to receive voice commands from the user.

I/O subsystem 713 can include touch surface controller 717 and/or other input controller(s) 715. Touch surface controller 717 can be coupled to a touch surface 718. Touch surface 718 and touch surface controller 717 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 746. Touch surface 718 can include, for example, a touch screen or the digital crown of a smart watch. I/O subsystem 713 can include a haptic engine or device for providing haptic feedback (e.g., vibration) in response to commands from processor 722 or a digital signal processor (DSP). In an embodiment, touch surface 718 can be a pressure-sensitive surface.

Other input controller(s) 744 can be coupled to other input/control devices 748, such as one or more buttons, rocker switches, thumb-wheel, infrared port and USB port. The one or more buttons (not shown) can include an up/down button for volume control of speaker 703 and/or microphones 704. Touch surface 718 or other input control devices 716 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 718; and a pressing of the button for a second duration that is longer than the first duration may turn power to the mobile device on or off. The user may be able to customize a functionality of one or more of the buttons. The touch surface 718 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 721 can be coupled to memory 723. Memory 723 can include high-speed random access memory and/or non-volatile memory, such as one or more magnetic disk storage devices, one or more optical storage devices and/or flash memory (e.g., NAND, NOR). Memory 750 can store operating system 724, such as the iOS operating system developed by Apple Inc. of Cupertino, California. Operating system 752 may include instructions for handling basic system services and for performing hardware dependent tasks. In some implementations, operating system 724 can include a kernel (e.g., UNIX kernel).

Memory 723 may also store communication instructions 725 to facilitate communicating with one or more additional devices, one or more computers and/or one or more servers, such as, for example, instructions for implementing a software stack for wired or wireless communications with other devices. Memory 723 may include graphical user interface instructions 726 to facilitate graphic user interface processing; sensor processing instructions 727 to facilitate sensor-related processing and functions; phone instructions 728 to facilitate phone-related processes and functions; electronic messaging instructions 729 to facilitate electronic-messaging related processes and functions; web browsing instructions 730 to facilitate web browsing-related processes and functions; media processing instructions 731 to facilitate media processing-related processes and functions; GNSS/Location instructions 732 to facilitate generic GNSS and location-related processes; and camera/3D depth sensor instructions 733 for capturing images (e.g., video, still images) and depth data (e.g., a point cloud). Memory 723 further includes spatial audio instructions 734 for use in spatial audio applications, including head pose tracking instructions and posture transition determination instructions for implementing the features described in reference to FIGS. 1-6.

Each of the above identified instructions and applications can correspond to a set of instructions for performing one or more functions described above. These instructions need not be implemented as separate software programs, procedures, or modules. Memory 23 can include additional instructions or fewer instructions. Furthermore, various functions of the mobile device may be implemented in hardware and/or in software, including in one or more signal processing and/or application specific integrated circuits.

Figure 8:
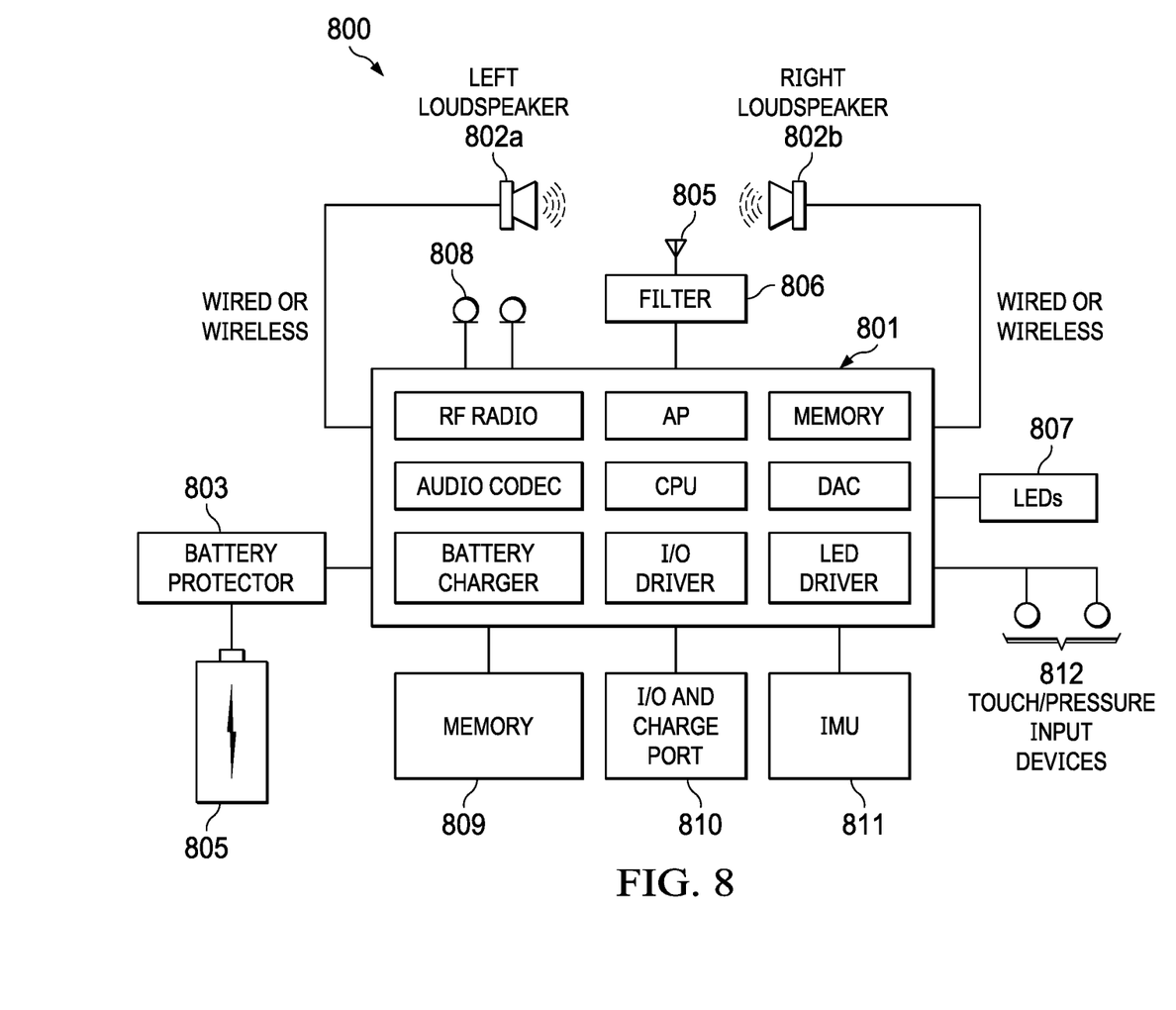
FIG. 8 a conceptual block diagram of a headset software/hardware architecture implementing at least one of the features and operations described in reference to FIGS. 1-6.

FIG. 8 is a conceptual block diagram of headset software/hardware architecture 800 implementing the features and operations described in reference to FIGS. 1-6. In an embodiment, architecture 800 can includes system-on-chip (SoC) 801, stereo loudspeakers 802a, 802b (e.g., ear buds, headphones, ear phones), battery protector 803, rechargeable battery 804, antenna 805, filter 806, LEDs 807, microphones 808, memory 809 (e.g., flash memory), I/O/Charge port 810, IMU 811 and pushbuttons 812 (or touch sensors, pressure sensors) for turning the headset on and off, adjusting volume, muting, etc. IMU 811 was previously described in reference to FIGS. 1-6, and includes, for example, a 3-axis MEMS gyro and a 3-axis MEMS accelerometer. SoC 801 can be included in one or both left and right wireless ear pierces comprising headset 800.

SoC 801 further includes various modules, such as a radio frequency (RF) radio (wireless transceiver) for wireless bi-directional communication with other devices, such as a source device, as described in reference to FIGS. 1-6. SoC 801 further includes an application processor (AP) for running specific applications, memory (e.g., flash memory), central processing unit (CPU) for managing various functions of the headsets, audio codec for encoding/decoding audio, battery charger for charging/recharging rechargeable battery 804, I/O driver for driving I/O and charge port (e.g., a micro USB port), digital to analog converter (DAC) converting digital audio into analog audio and LED driver for driving LEDs 807. Other embodiments can have more or fewer components.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
obtaining, with at least one processor, motion data obtained from at least one motion sensor worn by a user;
obtaining, with the at least one processor, at least one frame of skeletal data of the user based on at least one of camera data or depth data;
calibrating, with the at least one processor, the motion data and skeletal data to determine a calibration offset, wherein determining the calibration offset includes:
determining a calibration error based on a difference between an estimated joint position and velocity from the skeletal data and a previously estimated joint position and velocity from the skeletal data;
updating the calibration offset based on the calibration error;
synchronizing the motion data and skeletal data;
generating the estimated joint position and velocity by:
aligning reference frames of the synchronized motion data and the synchronized skeletal data based on the calibration offset;
estimating the joint position and velocity based on the aligned reference frames of the motion data and skeletal data; and
classifying, by a machine learning model, an estimated body pose of the user based on the estimated joint position and velocity.

2. The method of claim 1, wherein the at least one motion sensor is worn on limb of the user.

3. The method of claim 1, wherein the at least one motion sensor is worn on or in at least one ear of the user.

4. The method of claim 1, wherein the motion data is acceleration data and estimating the joint position and velocity, further comprises:
estimating, based on a change in the acceleration data, a change in velocity of the joint position; and
estimating, based on the change in velocity, a change in the at least one joint position.

5. The method of claim 4, wherein the estimating of a change in position and velocity of the joint position is provided by a Kalman filter where the acceleration data and joint position are observations used by the Kalman filter to estimate the change in the position and velocity of the at least one joint position.

6. The method of claim 5, wherein the at least one joint position is interpolated from a plurality of joint positions.

7. The method of claim 6, wherein the at least one joint position is interpolated using polynomial interpolation.

8. The method of claim 1, wherein the skeletal data is three-dimensional (3D) skeletal data.

9. A system comprising:
at least one processor;
memory storing instruction that when executed by the at least one processor, causes the at least one processor to perform operations comprising:
obtaining motion data obtained from at least one motion sensor worn by a user;
obtaining at least one frame of skeletal data of the user based on at least one of camera data or depth data;
calibrating the motion data and skeletal data to determine a calibration offset, wherein determining the calibration offset includes:
determining a calibration error based on a difference between an estimated joint position and velocity from the skeletal data and a previously estimated joint position and velocity from the skeletal data;
updating the calibration offset based on the calibration error;
synchronizing the motion data and skeletal data;
generating the estimated joint position and velocity by:
aligning reference frames of the synchronized motion data and the synchronized skeletal data based on the calibration offset;
estimating the joint position and velocity based on the aligned reference frames of the motion data and skeletal data; and
classifying, by a machine learning model, an estimated body pose of the user based on the estimated joint position and velocity.

10. The system of claim 9, wherein the at least one motion sensor is worn on limb of the user.

11. The system of claim 9, wherein the at least one motion sensor is worn on or in at least one ear of the user.

12. The system of claim 9, wherein the motion data is acceleration data and estimating the joint position and velocity, further comprises:
estimating, based on a change in the acceleration data, a change in velocity of the joint position; and
estimating, based on the change in velocity, a change in the joint position.

13. The system of claim 12, wherein the estimating of the change in the position and velocity of the joint position is provided by a Kalman filter where the acceleration data and joint position are observations used by the Kalman filter to estimate the change in the position and velocity of the joint position.

14. The system of claim 13, wherein the joint position is interpolated from a plurality of joint positions.

15. The system of claim 14, wherein the joint position is interpolated using polynomial interpolation.

16. The system of claim 9, wherein the skeletal data is three-dimensional (3D) skeletal data.

* * * * *

UNITED STATES PATENT AND TRADEMARK OFFICE
CERTIFICATE OF CORRECTION

| | | |
|---|---|---|
| PATENT NO. | : 12,450,949 B2 | Page 1 of 1 |
| APPLICATION NO. | : 17/950664 | |
| DATED | : October 21, 2025 | |
| INVENTOR(S) | : Aditya Sarathy et al. | |

It is certified that error appears in the above-identified patent and that said Letters Patent is hereby corrected as shown below:

On the Title Page

Column 2, Item (56) (Other Publications), Delete "lmus" and insert -- Imus --;

In the Claims

Column 11, Line 41, In Claim 4, after "the" delete "at least one";

Column 11, Line 46-47, In Claim 5, after "the" delete "at least one";

Column 11, Line 48, In Claim 6, after "the" delete "at least one";

Column 11, Line 50, In Claim 7, after "the" delete "at least one".

Signed and Sealed this
Thirteenth Day of January, 2026

John A. Squires
*Director of the United States Patent and Trademark Office*